US012752381B2

(12) United States Patent
Oda et al.

(10) Patent No.: US 12,752,381 B2
(45) Date of Patent: Oct. 6, 2026

(54) HEAT EXCHANGER MANUFACTURING DEVICE AND MANUFACTURING METHOD

(71) Applicant: DAIKIN INDUSTRIES, LTD., Osaka (JP)

(72) Inventors: Takaya Oda, Osaka (JP); Takaki Ohata, Osaka (JP); Motofumi Shimizu, Osaka (JP); Takayuki Takahashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/898,403

(22) Filed: Sep. 26, 2024

(65) Prior Publication Data

US 2025/0010413 A1 Jan. 9, 2025

Related U.S. Application Data

(63) Continuation of application No. PCT/JP2023/002522, filed on Jan. 26, 2023.

(30) Foreign Application Priority Data

Mar. 31, 2022 (JP) ................................ 2022-059776

(51) Int. Cl.
*B23P 15/26* (2006.01)

(52) U.S. Cl.
CPC .................................... *B23P 15/26* (2013.01)

(58) Field of Classification Search
CPC ............................... B23P 15/26; B21D 53/085
See application file for complete search history.

(56) References Cited

U.S. PATENT DOCUMENTS 4,584,751 A * 4/1986 Gray .................... B21D 53/085 29/523
5,996,217 A * 12/1999 Tokunaga ............ B23P 19/022 29/726
6,276,513 B1 * 8/2001 Asano ..................... B23P 19/04 198/406
10,343,239 B2 7/2019 Lee et al.
(Continued)

FOREIGN PATENT DOCUMENTS

CN 108422164 A 8/2018
CN 207840612 U 9/2018
JP 2020-169734 A 10/2020

OTHER PUBLICATIONS

ABB Robotics, YuMi Technical Details, YouTube, Published Apr. 13, 2015, available at https://www.youtube.com/watch?v=UluhIJXIkBA (Year: 2015).*
(Continued)

*Primary Examiner* — Kyle A Cook
(74) *Attorney, Agent, or Firm* — Spencer Fane LLP

(57) ABSTRACT

A heat exchanger includes a flat tube and a fin that is formed in an elongated plate shape and that includes a fin slit formed by notching the fin in a direction orthogonal to a longitudinal direction of the fin. A manufacturing device for manufacturing the heat exchanger includes an insertion head configured to move up and down in order to insert the flat tube held by the insertion head into the fin slit from above the fin, and a support. The support is configured to support, from below, the flat tube held by the insertion head.

4 Claims, 17 Drawing Sheets

(56) References Cited

U.S. PATENT DOCUMENTS

| | | | | |
|---|---|---|---|---|
| 2006/0231244 | A1* | 10/2006 | Sekine | B23K 3/087<br>165/905 |
| 2014/0023472 | A1* | 1/2014 | Sueoka | B25J 15/00<br>414/800 |
| 2014/0090238 | A1* | 4/2014 | Karasawa | B21D 43/20<br>29/726 |
| 2015/0367461 | A1* | 12/2015 | Kondou | B23P 15/26<br>29/726 |
| 2018/0031325 | A1* | 2/2018 | Katou | F28F 9/14 |
| 2018/0243813 | A1* | 8/2018 | Karasawa | B21D 53/085 |
| 2019/0193214 | A1* | 6/2019 | Morishita | B23P 15/26 |

OTHER PUBLICATIONS

Weiwei Wan, Four-Arm Collaboration: Two Dual-Arm Robots Work Together to Maneuver Tethered Tools, YouTube, Published on Sep. 29, 2020, available at https://www.youtube.com/watch?v=GwHvEJqBaLE (Year: 2020).*

International Preliminary Report of corresponding PCT Application No. PCT/JP2023/002522 dated Oct. 10, 2024.

International Search Report of corresponding PCT Application No. PCT/JP2023/002522 dated Mar. 20, 2023.

European Search Report of corresponding EP Application No. 23 77 8800.5 dated Jun. 6, 2025.

* cited by examiner

HEAT EXCHANGER MANUFACTURING DEVICE AND MANUFACTURING METHOD

CROSS-REFERENCE TO RELATED APPLICATIONS

This is a continuation of International Application No. PCT/JP2023/002522 filed on Jan. 26, 2023, which claims priority to Japanese Patent Application No. 2022-059776, filed on Mar. 31, 2022. The entire disclosures of these applications are incorporated by reference herein.

BACKGROUND

Technical Field

The present disclosure relates to a manufacturing device and manufacturing method for manufacturing a heat exchanger.

Background Art

Japanese Unexamined Patent Publication No. 2020-169734 discloses an assembling device for assembling a heat exchanger where flat heat transfer tubes are inserted into heat transfer fins. The assembling device includes a heat transfer tube insertion unit for inserting a plurality of heat transfer tubes into slots of the heat transfer fins.

The heat transfer tube insertion unit includes a heat transfer tube grip unit that moves up and down. The heat transfer tube grip unit moves down to the heat transfer fins arranged therebelow while gripping the heat transfer tubes. The heat transfer tube grip unit includes a press member having an elastic body to grip the side surfaces of the heat transfer tubes, and thus the gripped heat transfer tubes are less dropped.

SUMMARY

A first aspect of the present disclosure is directed to a manufacturing device for manufacturing a heat exchanger including a flat tube and a fin that is formed in an elongated plate shape and that includes a fin slit formed by notching the fin in a direction orthogonal to a longitudinal direction of the fin. The manufacturing device includes an insertion head and a support. The insertion head is configured to move up and down, thereby inserting the flat tube held by the insertion head into the fin slit from above the fin. The support is configured to support, from below, the flat tube held by the insertion head.

DETAILED DESCRIPTION OF EMBODIMENT(S)

Embodiments of the present invention will be described in detail below with reference to the drawings. The following embodiments are merely exemplary ones in nature, and are not intended to limit the scope, application, or uses of the invention. Features of the embodiments, variations, and other examples described below can be combined or partially substituted within the range where the present invention can be embodied.

(1) Air Conditioner

Figure 1:
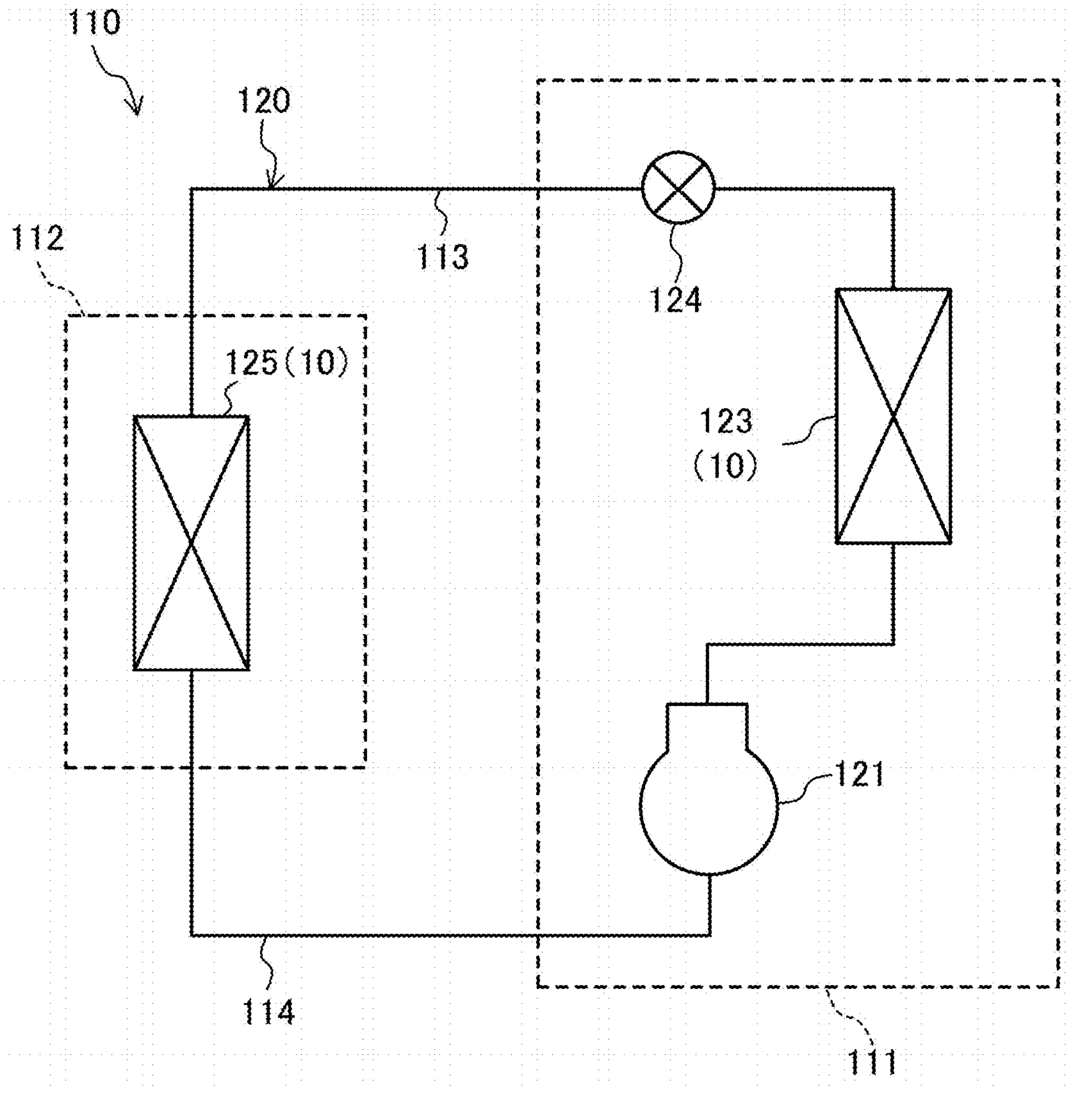
FIG. 1 is a piping system diagram showing a configuration of an air conditioner including a heat exchanger according to an embodiment.

An air conditioner (110) conditions air in an indoor space. Specifically, as shown in FIG. 1, the air conditioner (110) includes an outdoor unit (111) and an indoor unit (112). The outdoor unit (111) and the indoor unit (112) are connected to each other by a liquid connection pipe (113) and a gas connection pipe (114). Accordingly, a refrigerant circuit (120) is formed in the air conditioner (110).

The outdoor unit (111) includes a compressor (121), an outdoor heat exchanger (123), and an expansion valve (124). The compressor (121) compresses a refrigerant sucked from the gas connection pipe (114) and discharges a compressed refrigerant to the liquid connection pipe (113). The outdoor heat exchanger (123) exchanges heat between outdoor air and a refrigerant. The expansion valve (124) decompresses a refrigerant in the liquid connection pipe (113). The indoor unit (112) includes an indoor heat exchanger (125). The indoor heat exchanger (125) exchanges heat between outdoor air and a refrigerant.

(2) Heat Exchanger

The outdoor heat exchanger (123) and the indoor heat exchanger (125) are heat exchangers (10) of the present disclosure. Hereinafter, the outdoor heat exchanger (123) and the indoor heat exchanger (125) are collectively referred to as a heat exchanger (10).

Figure 2:
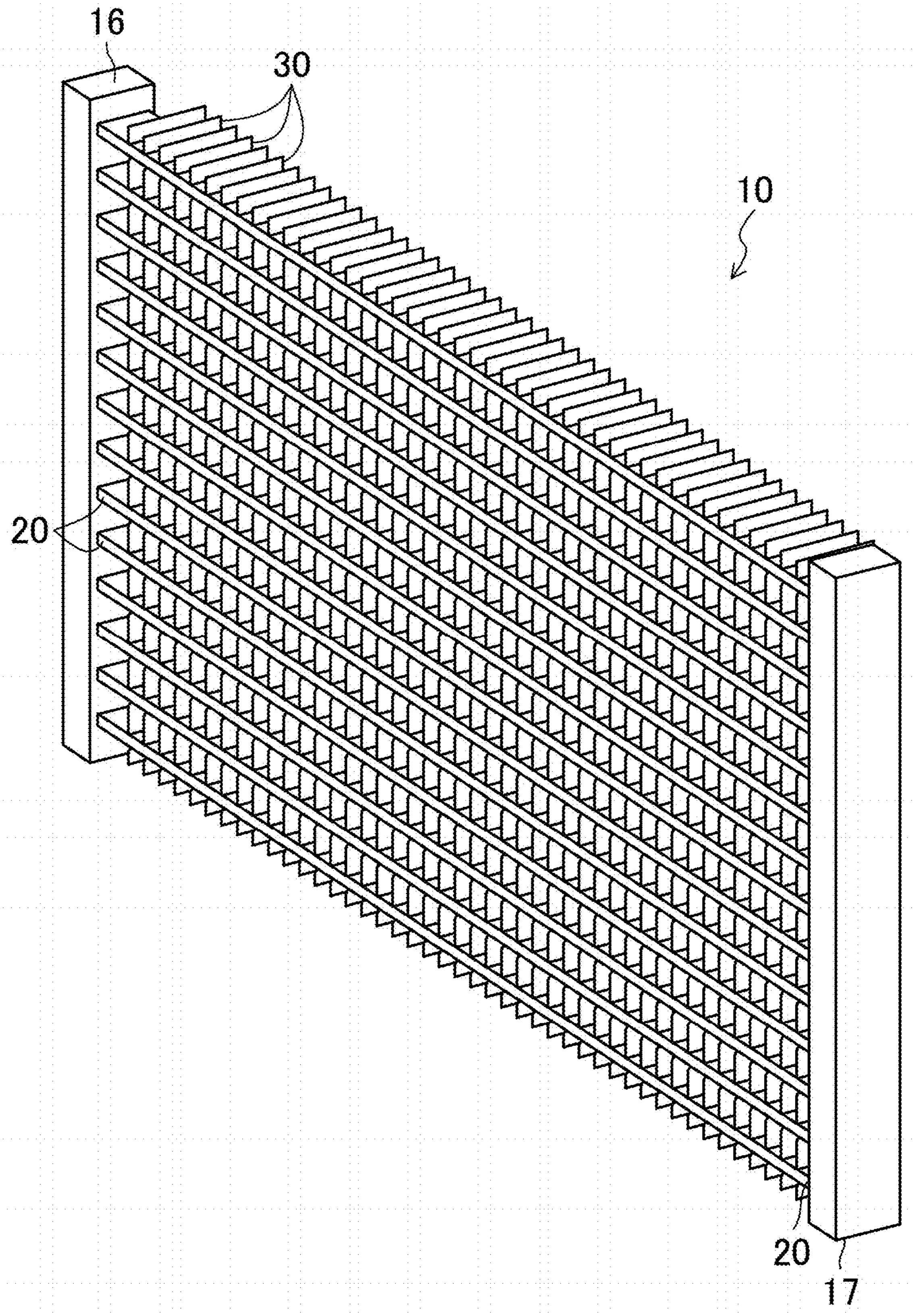
FIG. 2 is a schematic perspective view of the heat exchanger.
Figure 3:
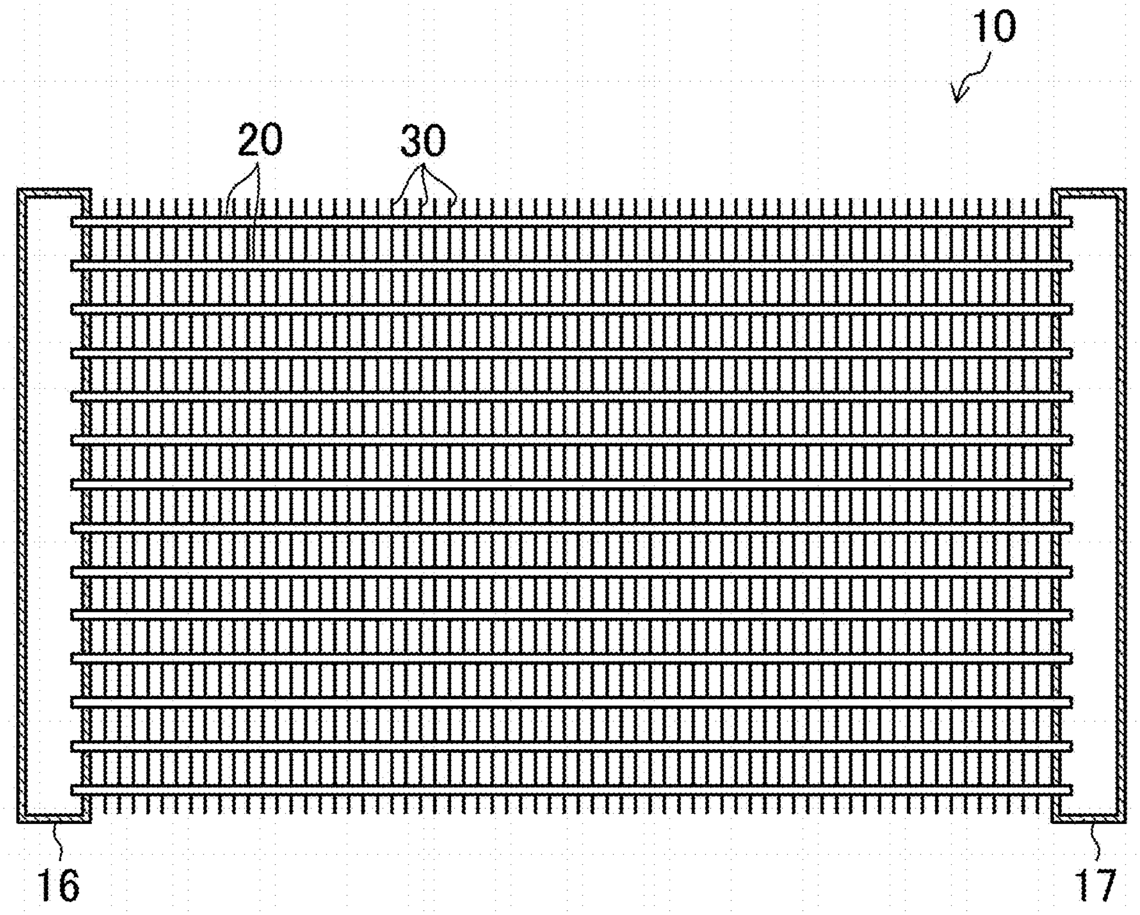
FIG. 3 is a cross-sectional view of the heat exchanger taken along the line III-III of FIG. 2.

As shown in FIGS. 2 and 3, the heat exchanger (10) of this embodiment includes a first header collecting pipe (16), a second header collecting pipe (17), a plurality of heat transfer tubes (20), and a plurality of fins (30). The first header collecting pipe (16), the second header collecting pipe (17), the heat transfer tubes (20), and the fins (30) are each made of an aluminum alloy.

(2-1) Header Collecting Pipe

As shown in FIG. 3, the first header collecting pipe (16) and the second header collecting pipe (17) are each formed in a hollow quadrangular prism. A plurality of holes are formed on one side surface of each of the first header collecting pipe (16) and the second header collecting pipe (17) in the longitudinal direction. These plurality of holes are holes into which ends of the plurality of heat transfer tubes (20) are inserted.

One end of each of the plurality of heat exchangers (10) is inserted into the first header collecting pipe (16), and the other end of each of the plurality of heat exchangers (10) is inserted into the second header collecting pipe (17).

(2-2) Heat Transfer Tube

Figure 4:
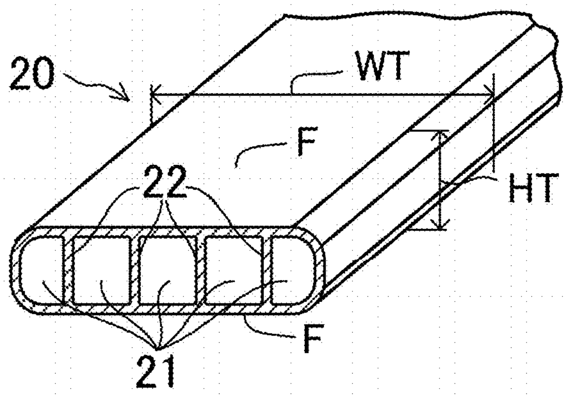
FIG. 4 is a schematic perspective view of a heat transfer tube of the embodiment.

As shown in FIG. 4, the heat transfer tube (20) has a rectangular cross section with round corners, the cross section being orthogonal to the direction in which the heat transfer tube (20) extends from one end to the other end. The heat transfer tube (20) is formed in a flat shape where the width WT is larger than the thickness HT. The heat transfer tube (20) is a flat tube (20) of the present disclosure. In the following description, the thickness direction and the width direction refer to the directions in the cross section of the heat transfer tube (20).

A plurality of flow passages (21) partitioned by partition walls (22) are formed in the heat transfer tube (20). In the heat transfer tube (20), the plurality of flow passages (21) extend parallel to each other in the direction in which the heat transfer tube (20) extends, and are opened at both end surfaces of the heat transfer tube (20). In the heat transfer tube (20), the plurality of flow passages (21) are arranged in a row in the width direction of the heat transfer tube (20).

The heat transfer tube (20) is inserted into fin slits (33) of the fins (30). The heat transfer tube (20) inserted into the fin slits (33) extends in a substantially horizontal direction, and is arranged so that its plate surfaces (F) extending in the width direction face each other. The plurality of heat transfer tubes (20) are arranged in a row at regular intervals.

One end of each heat transfer tube (20) is inserted into the first header collecting pipe (16), and the other end thereof is inserted into the second header collecting pipe (17). The header collecting pipes (16, 17) are fixed to the heat transfer tubes (20) by brazing using a brazing material.

(2-3) Fin

Figure 5:
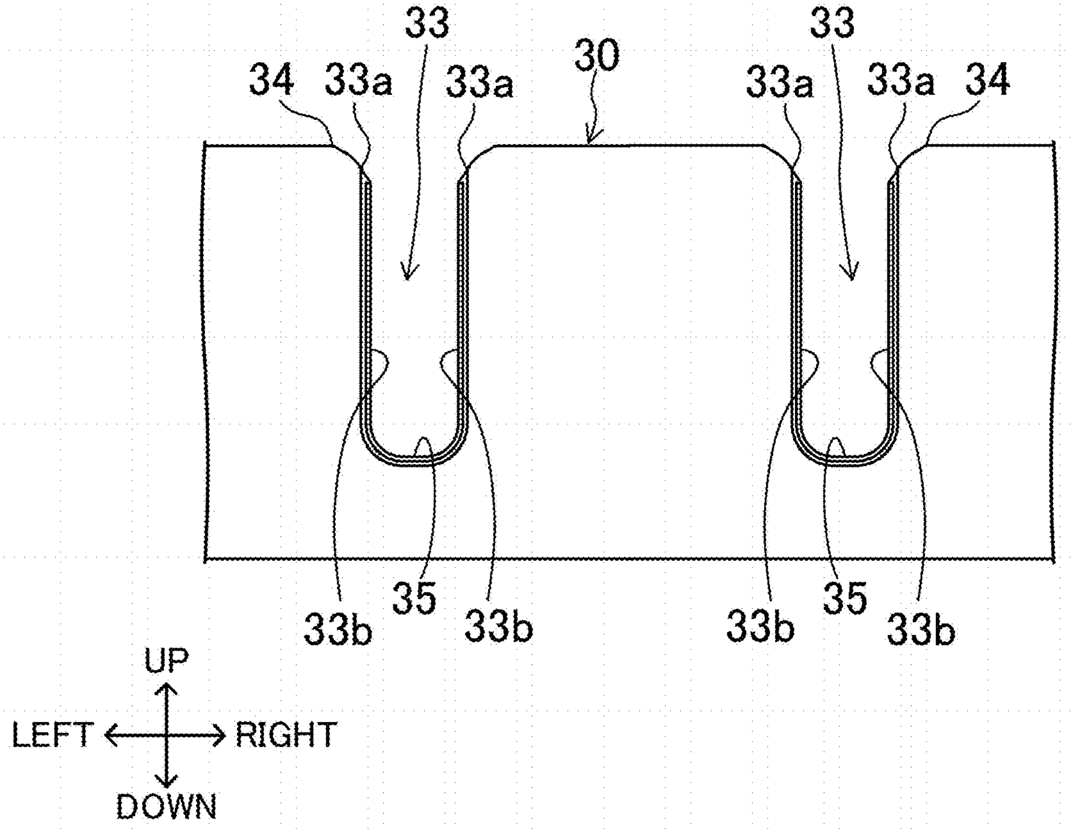
FIG. 5 is an enlarged front view of a main part of a fin of the embodiment.

As shown in FIG. 5, the fin (30) is an elongated plate-shaped member. The fin (30) is formed in a generally rectangular shape. The fin (30) is formed by pressing a flat plate-shaped material. In the following description, the long side direction of the fin (30) may be referred to as the left-right direction, and the short side direction (width direction) may be referred to as the up-down direction.

The fin (30) includes the plurality of fin slits (33). The fin slits (33) are formed in one of long sides of the fin (30). The plurality of fin slits (33) are provided in the fin (30) and spaced at regular intervals. Each fin slit (33) is formed by notching the fin (30) in the direction orthogonal to the longitudinal direction of the fin (30). The fin slit (33) is formed by notching the long side of the fin (30) in the width direction. The length from an open end (34) to a bottom surface (35) of the fin slit (33) is equal to the width length of the heat transfer tube (20).

The fin slit (33) is formed symmetrically. The fin slit (33) includes a first slit portion (33*a*) and a second slit portion (33*b*). The first slit portion (33*a*) and the second slit portion (33*b*) are continuously formed from the open end (34) to the bottom surface (35) of the fin slit (33).

The open end (34) of the first slit portion (33*a*) is the open end (34) of the fin slit (33). A lower end of the first slit portion (33*a*) meets an upper end of the second slit portion (33*b*). The first slit portion (33*a*) is formed in a taper shape and has a slit width gradually narrowed from the upper end to the lower end. Accordingly, when the heat transfer tube (20) is inserted into the fin slit (33), the end of the heat transfer tube (20) abuts on the first slit portion (33*a*) such that the first slit portion (33*a*) guides the heat transfer tube (20) to the second slit portion (33*b*).

The second slit portion (33*b*) is narrower than a slit width of the open end (34) of the fin slit (33). The slit width of the second slit portion (33*b*) is constant. The slit width of the second slit portion (33*b*) is slightly narrower than the length of the heat transfer tube (20) in the thickness direction. By a fastening allowance being provided in this manner, the heat transfer tube (20) can be fitted into the second slit portion (33*b*) without gaps. The bottom surface (35) of the second slit portion (33*b*) is the bottom surface (35) of the corresponding fin slit (33). The bottom surface (35) of the second slit portion (33*b*) is formed in a U-shape so as to be in contact with the heat transfer tube (20) without gaps.

The fin (30) has fin tabs (not shown). The fin tab is formed by cutting and raising a part of the fin (30). The fin tabs are spaced at predetermined intervals in the longitudinal direction of the fin (30). The plurality of fins (30) are arranged to face each other in the thickness direction. The fin tabs are in contact with the adjacent one of the fins (30), thereby maintaining a certain distance between the fin (30) and the fin (30) adjacent to each other.

(3) Device for Manufacturing Heat Exchanger

Figure 6:
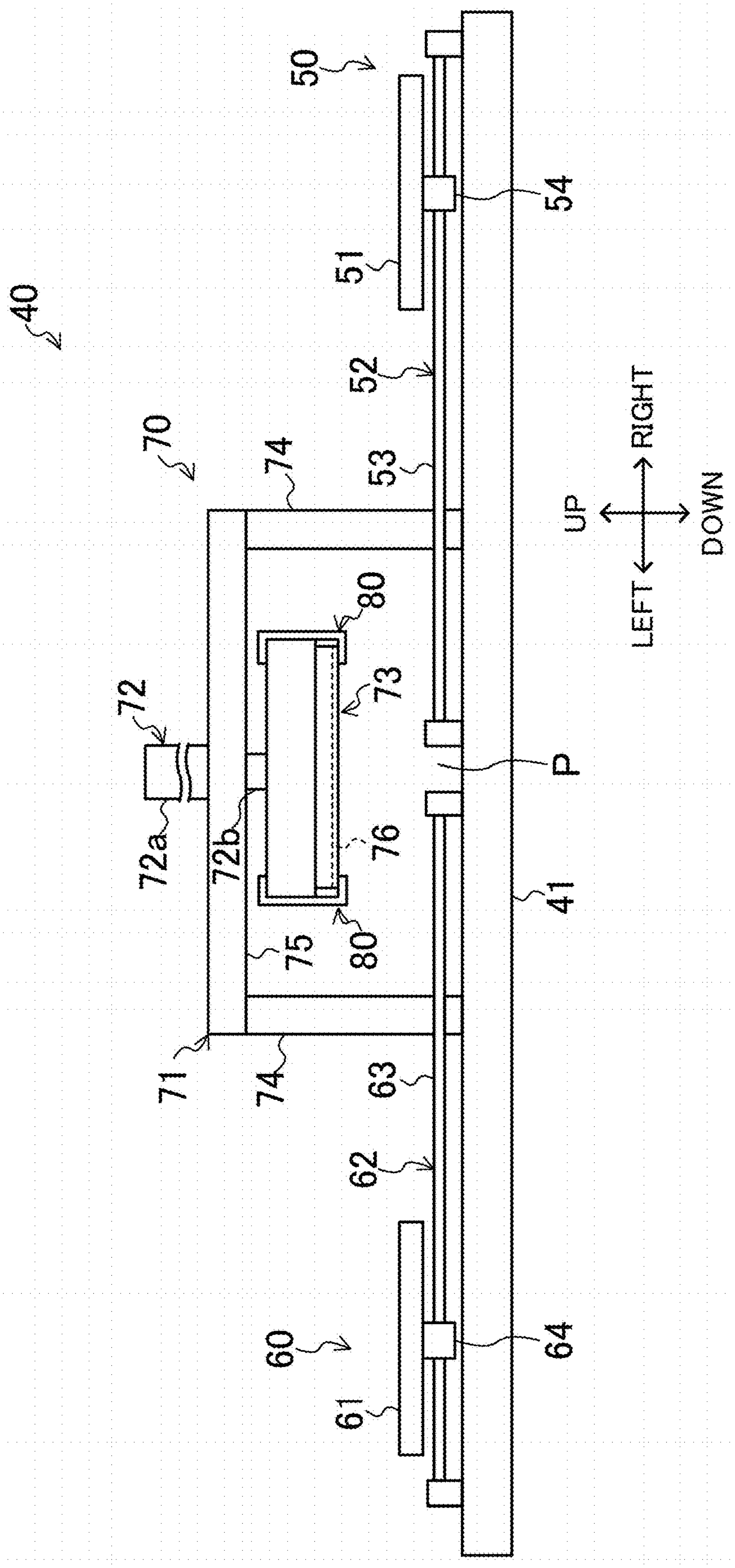
FIG. 6 is a front view showing a schematic configuration of a manufacturing device of the embodiment.

As shown in FIG. 6, a manufacturing device (40) of this embodiment is a device for assembling the heat exchanger (10). The manufacturing device (40) inserts the heat transfer tube (20) into the fin slit (33) of the fin (30).

The manufacturing device (40) of this example includes a base (41), a fin transport unit (50), a heat transfer tube transport unit (60), and a heat transfer tube insertion unit (70). The heat transfer tube transport unit (60), the fin transport unit (50), and the heat transfer tube insertion unit (70) are arranged on an upper surface of the base (41). When the manufacturing device (40) is viewed from the front, the heat transfer tube transport unit (60) is disposed on the left of the heat transfer tube insertion unit (70), and the fin transport unit (50) is disposed on the right of the heat transfer tube insertion unit (70). In the following description, “right”, “left”, “up”, and “down” indicate directions when the manufacturing device (40) is viewed from the front.

(3-1) Fin Transport Unit

The fin transport unit (50) transports the fins (30) to the heat transfer tube insertion unit (70). The fin transport unit (50) of this embodiment includes a first transport mechanism (52) and a fin tray (51).

The first transport mechanism (52) is a ball screw. The first transport mechanism (52) includes a first screw shaft (53) and a first nut portion (54). The first screw shaft (53)

extends from the right end of the base (41) to a delivery position (P) which will be described later. The first screw shaft (53) is driven and rotated by a given motor (not shown). The first screw shaft (53) is screwed into the first nut portion (54).

The first nut portion (54) moves in the left-right direction by rotation of the first screw shaft (53). The first nut portion (54) fixes a lower surface of the fin tray (51). The fin tray (51) moves on the first screw shaft (53) in the left-right direction as the first nut portion (54) moves.

Figure 7:
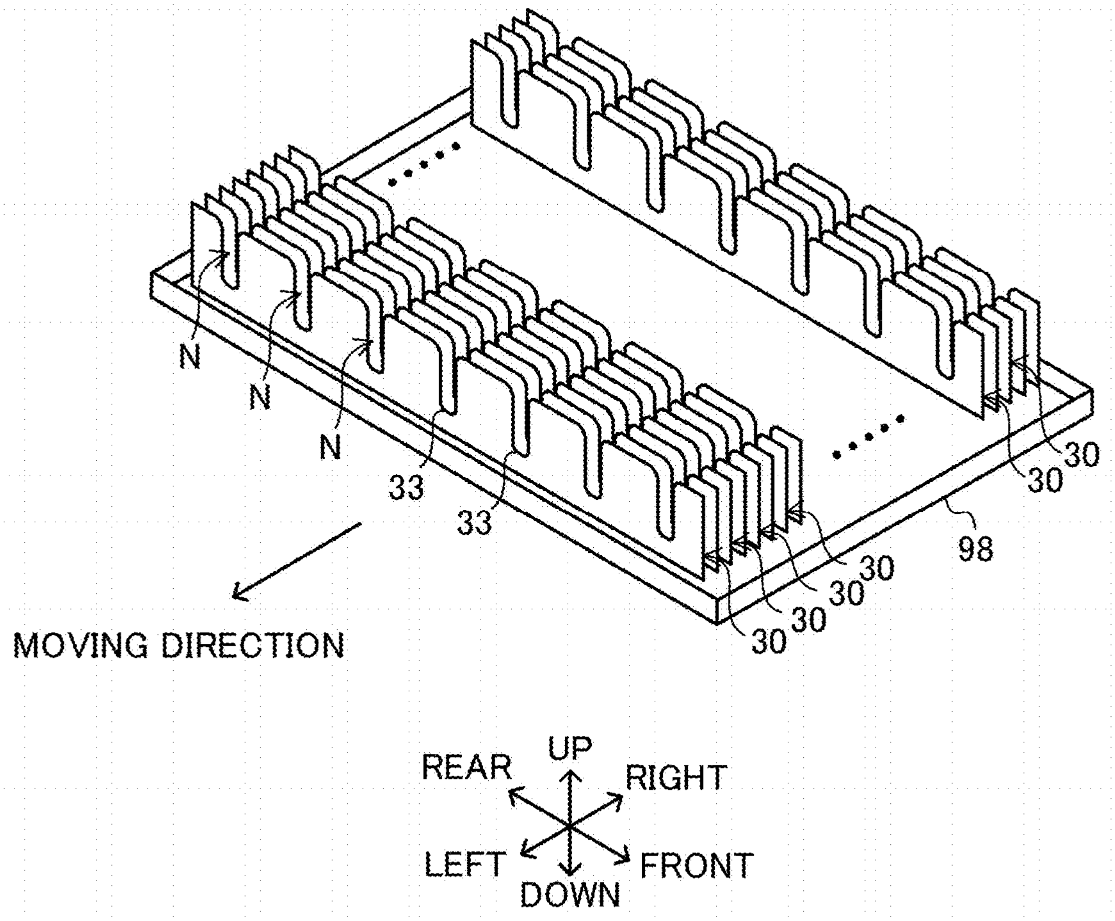
FIG. 7 is a perspective view of fins arranged in a fin tray.

The plurality of fins (30) are mounted in the fin tray (51) (see FIG. 7). The fin tray (51) in which the fins (30) are mounted moves from right to left. The plurality of fins (30) in the fin tray (51) are arranged so as to be adjacent to each other in the left-right direction in a state in which the open ends of the fin slits (33) of each fin (30) are opened upward. At this time, when viewed in the arrangement direction in which the fins (30) are arranged, the fins (30) are arranged so that the fin slits (33) of the fins (30) adjacent to each other match each other. The fin slits (33) arranged in a row in the left-right direction in this manner are referred to as a fin slit row (N). The number of fin slit rows (N) is equal to the number of fin slits (33).

(3-2) Heat Transfer Tube Transport Unit

The heat transfer tube transport unit (60) transports the heat transfer tubes (20) to the heat transfer tube insertion unit (70). The heat transfer tube transport unit (60) of this embodiment includes a second transport mechanism (62) and a heat transfer tube tray (61).

The second transport mechanism (62) is the same ball screw as the first transport mechanism (52). The second transport mechanism (62) includes a second screw shaft (63) and a second nut portion (64). The second screw shaft (63) extends from the left end of the base (41) to the delivery position (P) which will be described later. The second screw shaft (63) is driven and rotated by a given motor (not shown). The second screw shaft (63) is screwed into the second nut portion (64).

The second nut portion (64) moves in the left-right direction by rotation of the second screw shaft (63). The second nut portion (64) fixes a lower surface of the heat transfer tube tray (61). The heat transfer tube tray (61) moves on the second screw shaft (63) in the left-right direction as the second nut portion (64) moves.

The plurality of fins (30) are mounted inside the heat transfer tube tray (61). The heat transfer tube tray (61) in which the heat transfer tubes (20) are mounted moves from left to right. The heat transfer tubes (20) in the heat transfer tube tray (61) are arranged so as to be adjacent to each other in the front-back direction. The heat transfer tubes (20) adjacent to each other has the plate surfaces (F) extending in the width direction of the heat transfer tubes (20) and facing each other.

(3-3) Heat Transfer Tube Insertion Unit

The heat transfer tube insertion unit (70) receives the heat transfer tubes (20) from the heat transfer tube tray (61) at the delivery position (P), and inserts the heat transfer tubes (20) into the fin slits (33) of the fins (30) of the fin tray (51) having moved to the delivery position (P).

The heat transfer tube insertion unit (70) includes a frame (71), a first cylinder (72), an insertion head (73), and a heat transfer tube support (80).

The frame (71) includes four columns (74) extending in the up-down direction and one head frame (75). The columns (74) are arranged at four corners of the heat transfer tube insertion unit (70) when the heat transfer tube insertion unit (70) is viewed from above. The head frame (75) is provided to connect upper ends of the four columns (74).

The first cylinder (72) is fixed to the center of the head frame (75). The first cylinder (72) includes a first cylinder tube (72*a*) and a first piston rod (72*b*). The first cylinder (72) is a hydraulic cylinder, for example. The first piston rod (72*b*) is extended and contracted in the up-down direction by adjustment to the oil pressure in the first cylinder tube (72*a*).

The insertion head (73) is fixed to a lower end of the first piston rod (72*b*). The insertion head (73) is moved up and down by extension and contraction of the first piston rod (72*b*). The insertion head (73) is formed in a substantially rectangular parallelepiped shape. The insertion head (73) has a lower surface provided with a plurality of grooves (76). The grooves (76) are portions into which upper portions of the heat transfer tubes (20) are inserted. Each groove extends in the left-right direction. The plurality of grooves (76) are arranged in the front-back direction. The distance between the grooves (76) adjacent to each other is equal to the distance between the heat transfer tubes (20) adjacent to each other (see FIGS. 9 and 10).

(3-4) Heat Transfer Tube Support

The heat transfer tube support (80) is a member that holds the heat transfer tubes (20) gripped by the insertion head (73). The heat transfer tube support (80) supports the heat transfer tubes (20) from below at both right and left sides of the insertion head (73). The heat transfer tube support (80) is provided on the insertion head (73) and moves up and down together with the insertion head (73). The heat transfer tube support (80) supports, from below, the heat transfer tubes (20) held by the insertion head (73) at the delivery position (P). The heat transfer tube support (80) moves up and down together with the insertion head (73), while supporting the heat transfer tubes (20) from below. The heat transfer tube support (80) is an example of the support (80) of the present disclosure.

Figure 8:
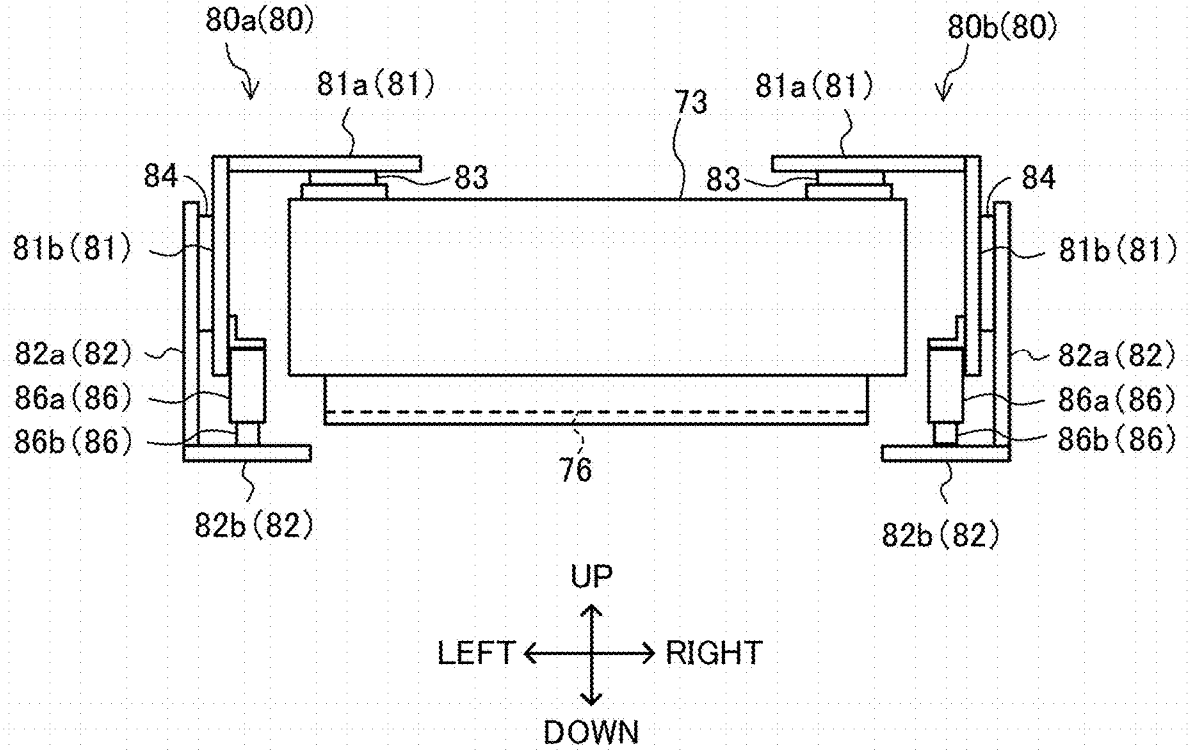
FIG. 8 is a front view showing a schematic configuration of a heat transfer tube insertion unit of the embodiment.
Figure 9:
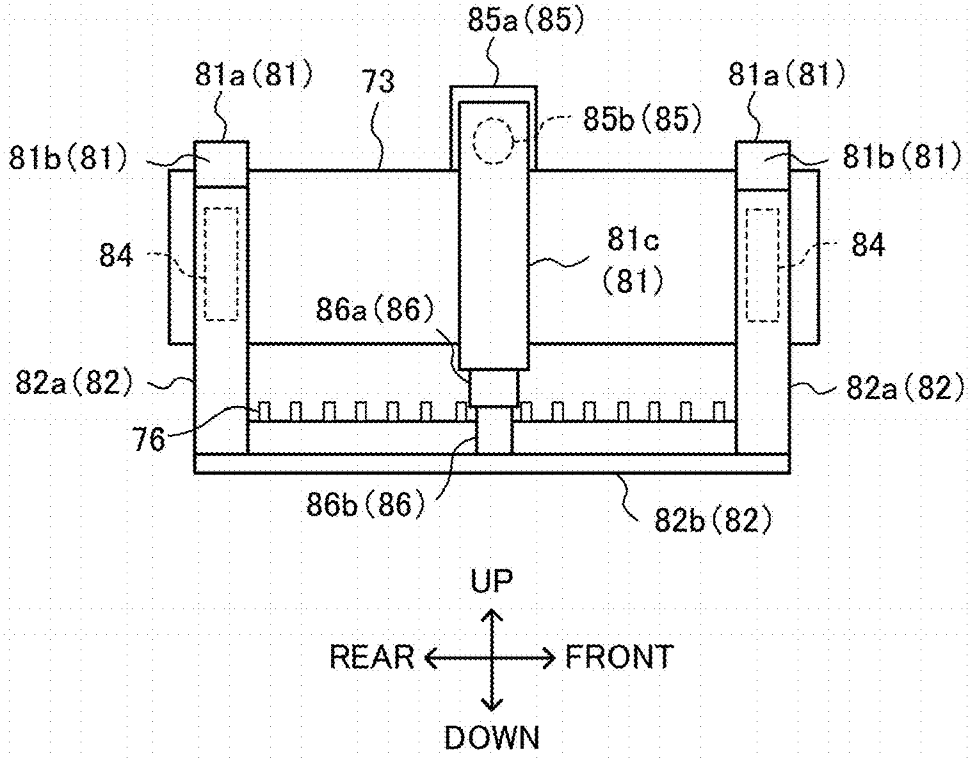
FIG. 9 is a side view showing a schematic configuration of the heat transfer tube insertion unit.
Figure 10:
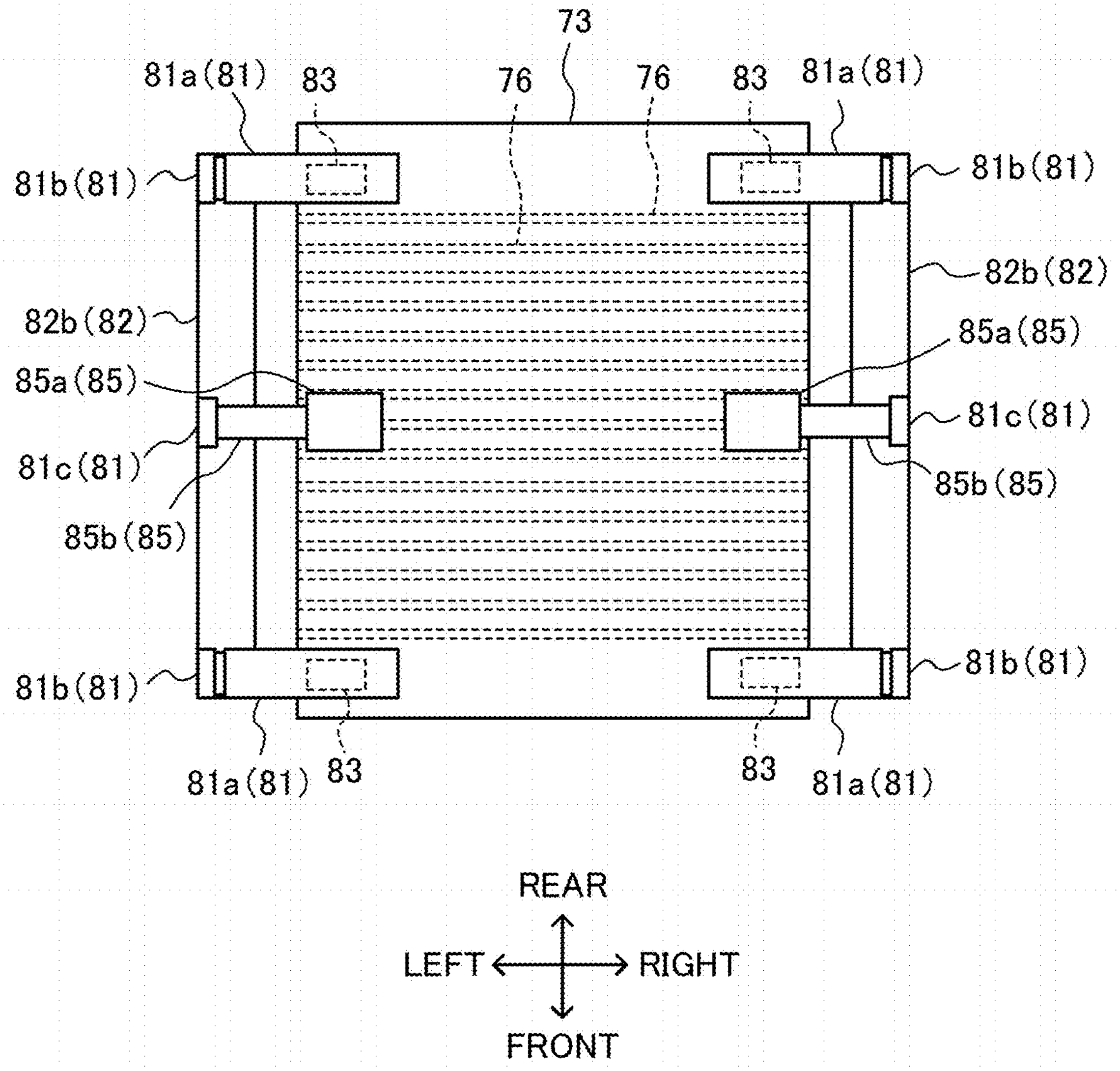
FIG. 10 is a top view showing a schematic configuration of the heat transfer tube insertion unit.

As shown in FIGS. 8 to 10, the heat transfer tube support (80) includes a first mechanism (80*a*) and a second mechanism (80*b*). The first mechanism (80*a*) is provided at a left end of the insertion head (73), and the second mechanism (80*b*) is provided at a right end of the insertion head (73). The first mechanism (80*a*) and the second mechanism (80*b*) operate symmetrically. The components of the first mechanism (80*a*) and the second mechanism (80*b*) are the same and are arranged symmetrically. The description of the first mechanism (80*a*) will be provided below, and the description of the second mechanism (80*b*) will be omitted.

The first mechanism (80*a*) includes an upper arm unit (81) that reciprocates in the left-right direction and a lower arm unit (82) that reciprocates in the up-down direction.

The upper arm unit (81) includes first upper arms (81*a*), second upper arms (81*b*), and a middle arm (81*c*). The first upper arms (81*a*) are a pair of arms arranged on the front side and the rear side of the left end of the upper surface of the insertion head (73). The first upper arms (81*a*) each extend right and left. Each first upper arm (81*a*) is slidably connected to a first guide rail (83) provided on the upper surface of the insertion head (73). The first guide rail (83) extends in the left-right direction.

The second upper arms (81*b*) are a pair of arms extending downward from the left ends of the first upper arms (81*a*). The second upper arms (81*b*) are each provided with a second guide rail (84) extending in the up-down direction.

The first mechanism (80*a*) includes a second cylinder (85) and a third cylinder (86). The second cylinder (85) includes a second cylinder tube (85*a*) and a second piston rod (85*b*). The second cylinder tube (85*a*) is disposed at the left end of the upper surface of the insertion head (73) and near the center between the front and rear ends. The second piston rod (85*b*) extends and contracts in the left-right direction. The tip end of the second piston rod (85*b*) is connected with the upper end of the middle arm (81*c*). The middle arm (81*c*) is disposed between the two second upper arms (81*b*) and extends in the up-down direction.

The third cylinder (86) includes a third cylinder tube (86*a*) and a third piston rod (86*b*). The third cylinder tube (86*a*) is provided at the lower end of the middle arm (81*c*). The third piston rod (86*b*) extends and contracts in the up-down direction. The lower end of the third piston rod (86*b*) is connected with a second lower arm (82*b*) which will be described later.

The lower arm unit (82) includes first lower arms (82*a*) and the second lower arm (82*b*). The first lower arms (82*a*) are a pair of arms extending in the up-down direction. The first lower arms (82*a*) are slidably connected to the second guide rails (84) of the second upper arms (81*b*).

The second lower arm (82*b*) is a plate-shaped member extending in the front-back direction. An upper surface of the second lower arm (82*b*) supports ends of the heat transfer tubes (20). A front end and a lower end of the second lower arm (82*b*) are fixed to lower ends of the first lower arms (82*a*). An end of the second piston rod (85*b*) is fixed to the center of the second lower arm (82*b*).

The second lower arms (82*b*) of the first mechanism (80*a*) and the second mechanism (80*b*) perform a first operation and a second operation. In the first operation, the second lower arms (82*b*) come into contact with the heat transfer tubes (20). In the second operation, the second lower arms (82*b*) leave the heat transfer tubes (20). The first operation and the second operation will be described in detail later.

(3-5) Control Unit

Figure 11:
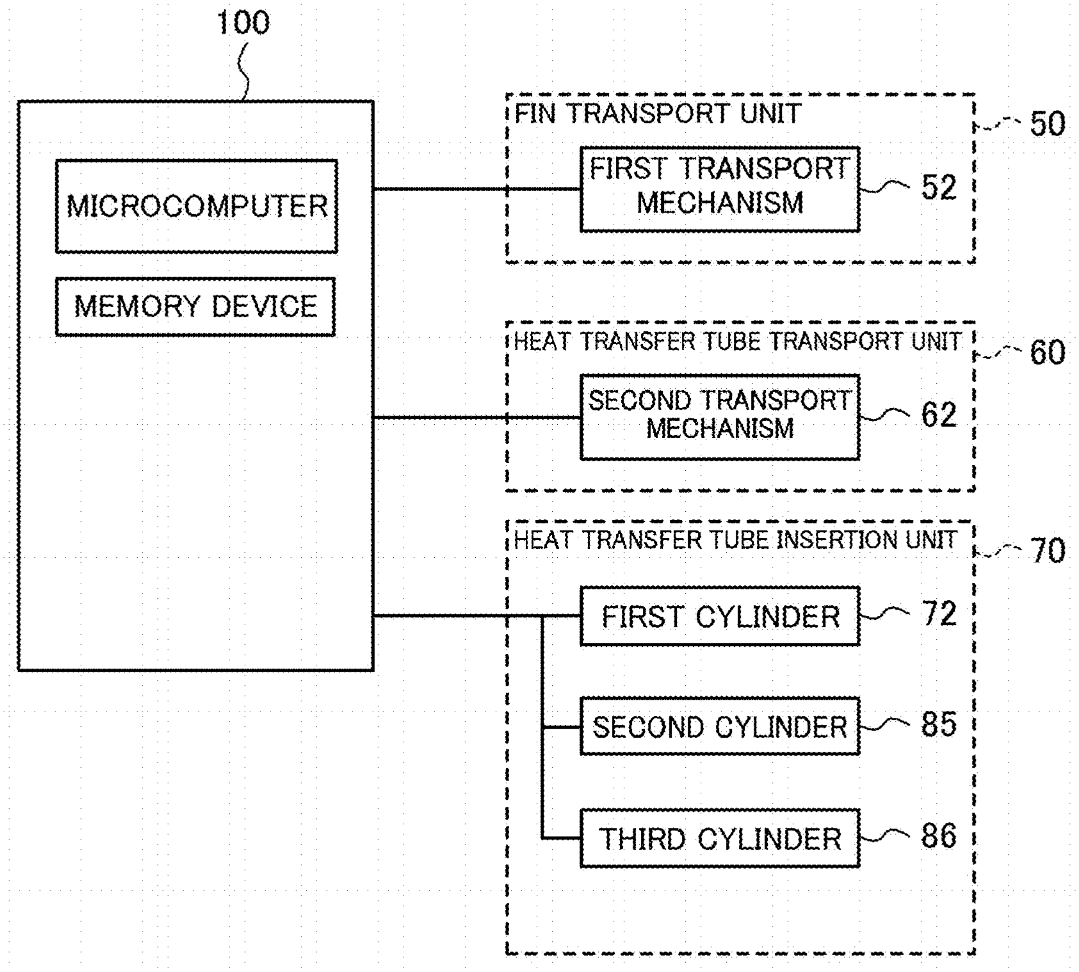
FIG. 11 is a block diagram showing the relationship between a control unit and devices.
Figure 12:
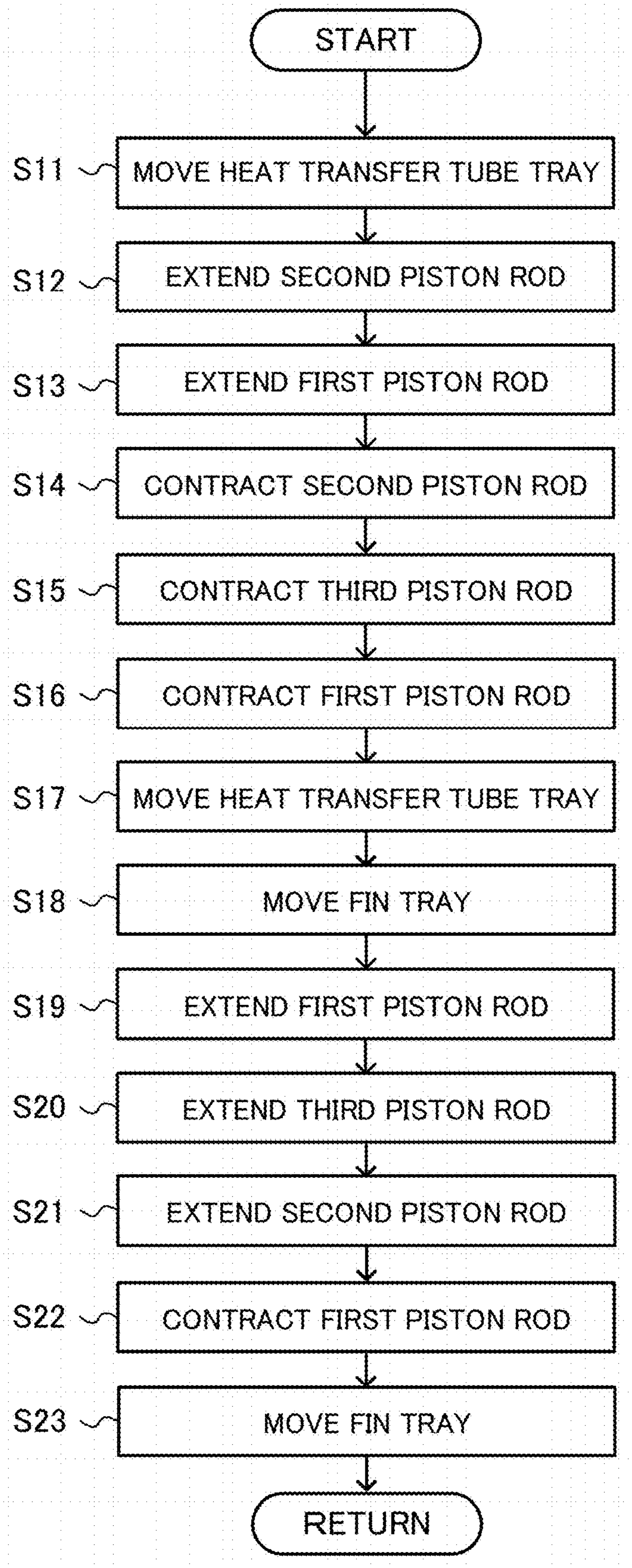
FIG. 12 is a flowchart showing a flow of assembling fins and heat transfer tubes.

As shown in FIG. 11, the manufacturing device (40) includes a control unit (100). The control unit (100) includes a microcomputer and a memory device that stores software for operating the microcomputer. The control unit (100) controls operations of various devices of the manufacturing device (40).

(4) Manufacturing Method for Manufacturing Heat Exchanger

The manufacturing method for manufacturing the heat exchanger (10) of this embodiment includes using the insertion head (73) to hold the heat transfer tubes (20); supporting, from below, the heat transfer tubes (20) held by the insertion head (73); and inserting the heat transfer tubes (20) into the fin slits (33) from above the fins (30) by the insertion head (73) moving up and down. Specific description will be given below with reference to FIGS. 12 to 15. The straight arrows in FIGS. 13A, 13B, 13C, 13D, 13E, 14A, 14B, 14C, 14E and 14D indicate the directions in which the parts move.

In step S11, the control unit (100) instructs the second transport mechanism (62) to operate. By the operation of the second transport mechanism (62), the heat transfer tube tray (61) in which the plurality of heat transfer tubes (20) are mounted moves to the right and then is placed at the delivery position (P).

Figures 13A, 13B, 13C, 13D, 13E:
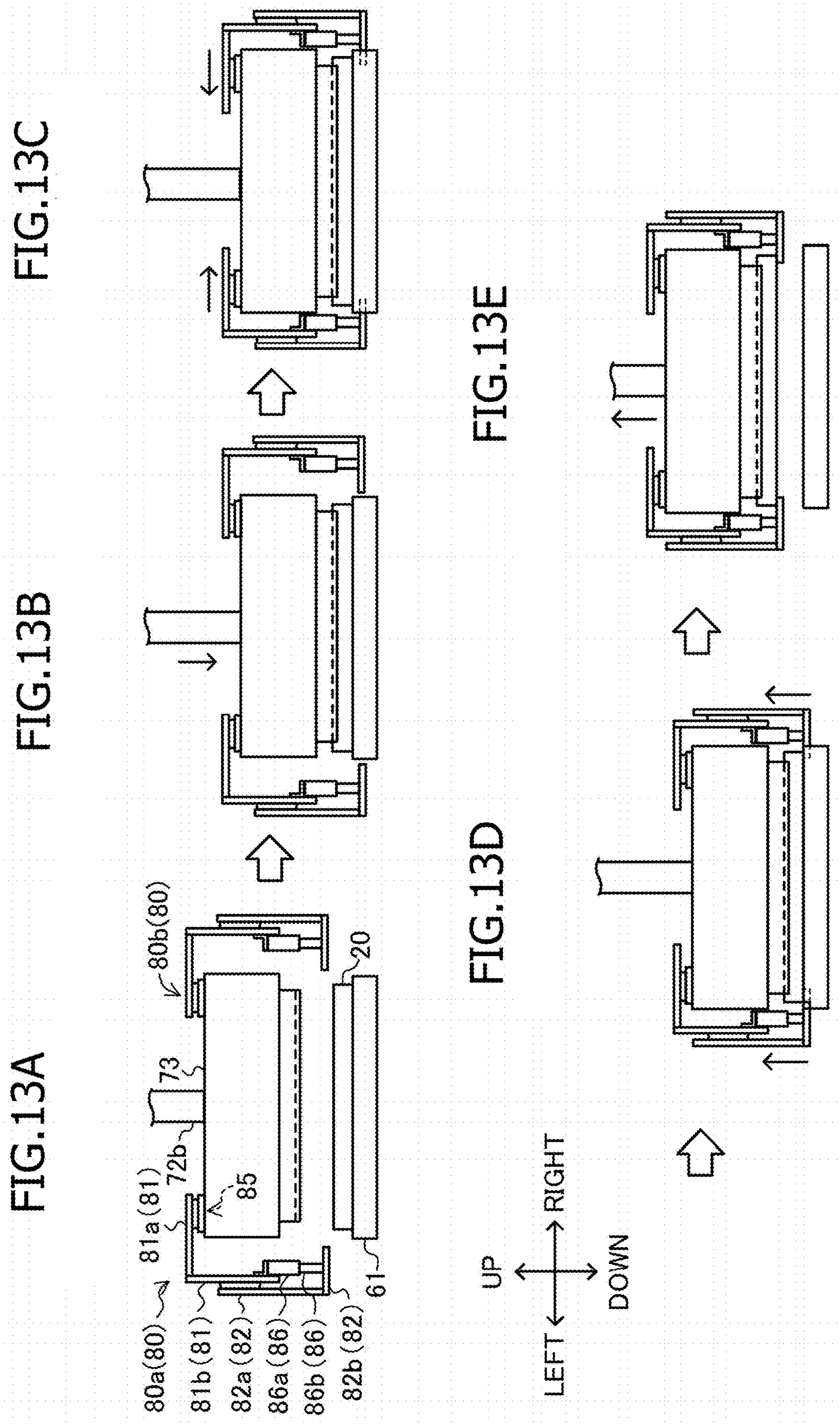
FIG. 13A, FIG. 13B, FIG. 13C, FIG. 13D and FIG. 13E show an operation of a heat transfer tube support, where the heat transfer tube insertion unit is supporting the heat transfer tube.

In step S12, the control unit (100) controls the second cylinder (85) to extend the second piston rod (85*b*). Accordingly, the upper arm unit (81) and the lower arm unit (82) of the first mechanism (80*a*) move to the left. The upper arm unit (81) and the lower arm unit (82) of the second mechanism (80*b*) move to the right (FIG. 13A).

In step S13, the control unit (100) controls the first cylinder (72) to extend the first piston rod (72*b*). Accordingly, the insertion head (73) moves down, and the upper portions of the heat transfer tubes (20) are inserted into the grooves (76) (FIG. 13B). At this time, there is a sufficient clearance between the right end of the second lower arm (82*b*) of the first mechanism (80*a*) and the left ends of the heat transfer tubes (20), and thus when the insertion head (73) moves down, the second lower arm (82*b*) does not come into contact with the heat transfer tubes (20). Similarly, there is a sufficient clearance between the left end of the second lower arm (82*b*) of the second mechanism (80*b*) and the right ends of the heat transfer tubes (20), and thus when the insertion head (73) moves down, the second lower arm (82*b*) does not come into contact with the heat transfer tubes (20).

In step S14, the control unit (100) controls the second cylinder (85) to contract the second piston rod (85*b*). Accordingly, the upper arm unit (81) and the lower arm unit (82) of the first mechanism (80*a*) move to the right, and the upper arm unit (81) and the lower arm unit (82) of the second mechanism (80*b*) move to the left. The second lower arms (82*b*) of the first mechanism (80*a*) and the second mechanism (80*b*) are each located just below the outer portions of the heat transfer tubes (20) (FIG. 13C). The outer portions of this embodiment are both ends of the heat transfer tubes (20). The "outer portions" of the heat transfer tubes (20) will be described in detail later.

In step S15, the control unit (100) controls the third cylinder (86) to contract the third piston rod (86*b*). Accordingly, the second lower arms (82*b*) of the first mechanism (80*a*) and the second mechanism (80*b*) move up and come into contact with both ends of the heat transfer tubes (20) (FIG. 13D). Specifically, the second lower arm (82*b*) of the first mechanism (80*a*) comes into contact with the lower surfaces of the left ends of the heat transfer tubes (20). The second lower arm (82*b*) of the second mechanism (80*b*) comes into contact with the lower surfaces of the right ends of the heat transfer tubes (20). In this manner, both the second lower arms (82*b*, 82*b*) support the outer portions of the plurality of heat transfer tubes (20) from below. The first operation of the heat transfer tube support (80) of this embodiment includes the operations of steps S12 to S15.

In step S16, the control unit (100) controls the first cylinder (72) to contract the first piston rod (72*b*). Accordingly, the insertion head (73) and the heat transfer tube support (80) move up, while holding the plurality of heat transfer tubes (20) (FIG. 13E). At this time, both ends of the plurality of heat transfer tubes (20) are supported from below by the two second lower arms (82*b*), and thus dropping of the heat transfer tubes (20) can be reduced.

In step S17, the control unit (100) controls the second transport mechanism (62) to move the heat transfer tube tray (61) from the delivery position (P) to the left.

Figures 14A, 14B, 14C, 14D, 14E:
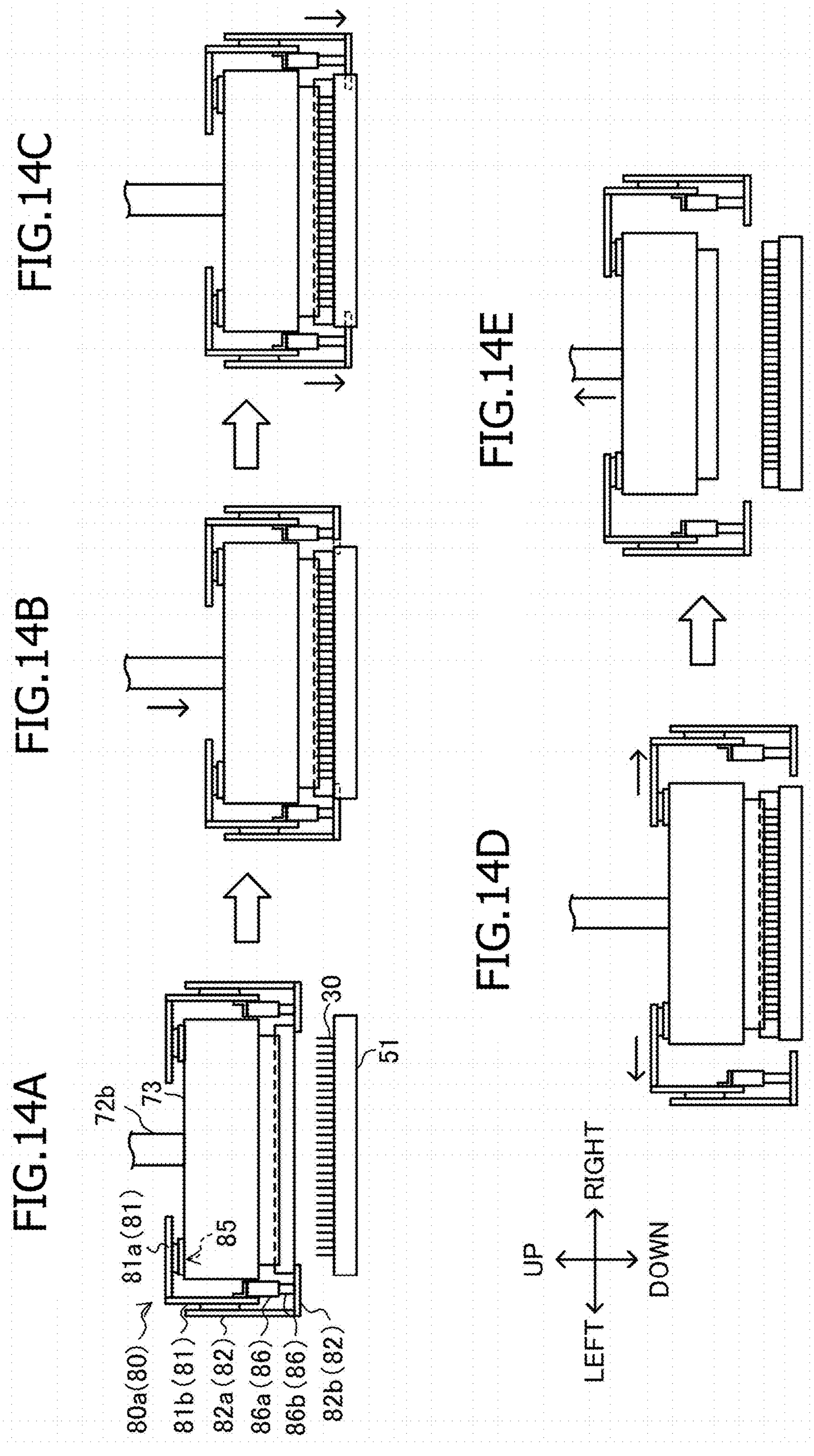
FIG. 14A, FIG. 14B, FIG. 14C, FIG. 14D and FIG. 14E show an operation of the heat transfer tube support, where the heat transfer tube insertion unit is inserting heat transfer tubes into fins.

In step S18, the control unit (100) instructs the first transport mechanism (52) to operate. By the operation of the first transport mechanism (52), the fin tray (51) in which the plurality of fins (30) are mounted moves to the left and then is placed at the delivery position (P). At this time, the plurality of fins (30) are located just below the insertion head (73) holding the plurality of heat transfer tubes (20) (FIG. 14A).

In step S19, the control unit (100) controls the first cylinder (72) to extend the first piston rod (72*b*). Accordingly, the heat transfer tube support (80) moves down together with the insertion head (73) while holding the heat transfer tubes (20). Just below the heat transfer tubes (20), their respective fin slit rows (N) are located, and thus by the insertion head (73) continuing to move down, the heat transfer tubes (20) are inserted into their respective fin slit rows (N) (FIG. 14B).

Figure 15:
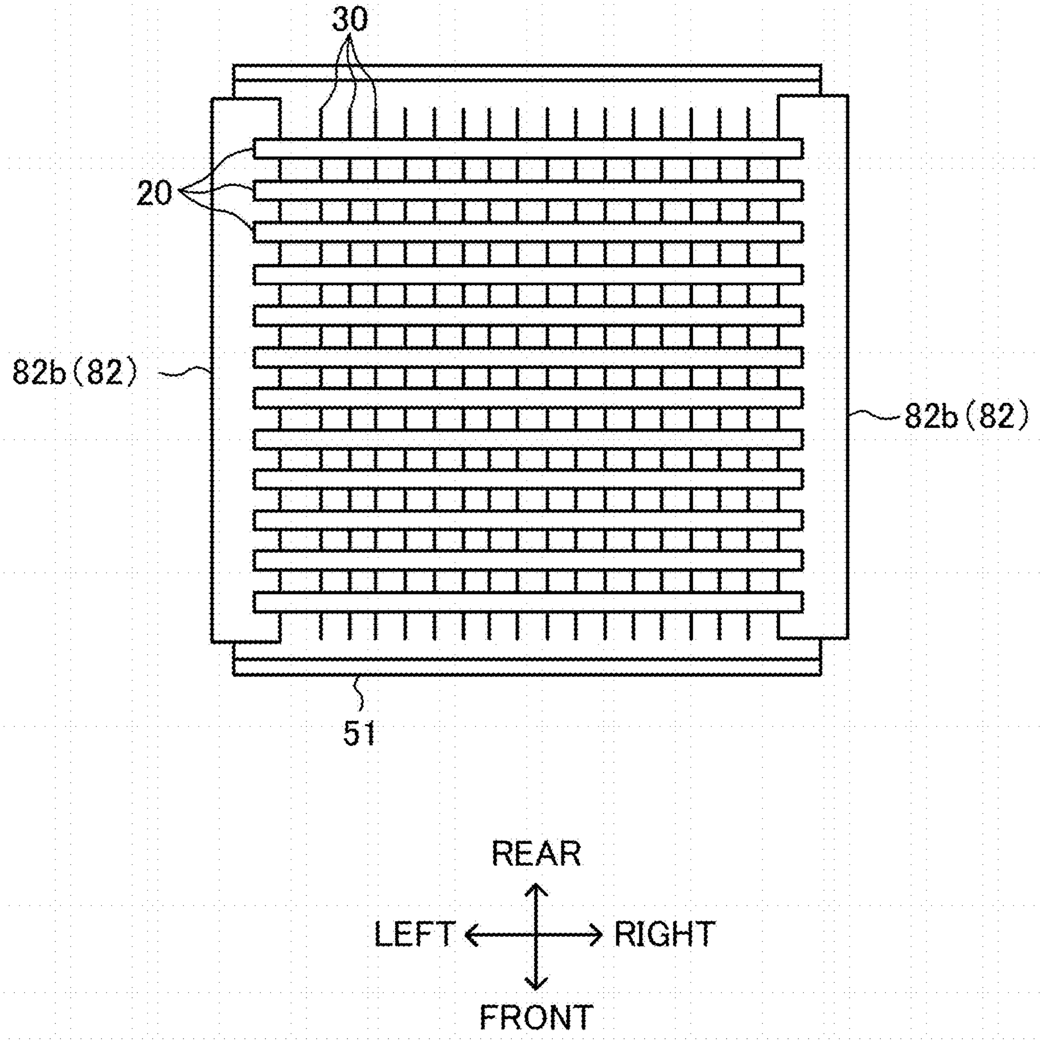
FIG. 15 is a top view schematically showing that the heat transfer tube support supports the heat transfer tubes.

At this time, when the heat transfer tubes (20) being arranged on the fins (30) are viewed from above, the outer portions of the heat transfer tubes (20) are located outside of two of the fins (30) each located at the respective one of both ends of the heat transfer tubes (20) in the direction in which the plurality of fins (30) are arranged (see FIG. 15). The second lower arm (82*b*) is in contact with the lower ends of those outer portions, and thus even when the insertion head (73) moves down, the second lower arm (82*b*) does not come into contact with the fins (30). In this manner, with the second lower arm (82*b*) being not interfered in by the fins (30), the heat transfer tubes (20) can be inserted into the fin slits (33).

In step S20, the control unit (100) controls the third cylinder (86) to extend the third piston rod (86*b*). Accordingly, the second lower arms (82*b*) of the first mechanism (80*a*) and the second mechanism (80*b*) move down and leave the lower surfaces of both sides of the heat transfer tubes (20) (FIG. 14C).

In step S21, the control unit (100) controls the second cylinder (85) to extend the second piston rod (85*b*). Accordingly, the second lower arm (82*b*) of the first mechanism (80*a*) moves to the left, and the right end of the second lower arm (82*b*) is located to the right of the left ends of the heat transfer tubes (20). The second lower arm (82*b*) of the second mechanism (80*b*) moves to the right, and the left end of the second lower arm (82*b*) is located to the right of the right ends of the heat transfer tubes (20) (FIG. 14D). The second operation of the heat transfer tube support (80) of this embodiment includes the operations of steps S20 to S21.

In step S22, the control unit (100) controls the first cylinder (72) to contract the first piston rod (72*b*). Accordingly, the insertion head (73) and the heat transfer tube support (80) move up (FIG. 14E). Thereafter, the heat transfer tubes (20) and the fins (30) proceed to the next step.

In step S23, the control unit (100) controls the first transport mechanism (52) to move the fin tray (51) from the delivery position (P) to the right.

(5) Features

(5-1) First Feature

The manufacturing device (40) of this embodiment for manufacturing a heat exchanger includes: the insertion head (73) configured to move up and down, thereby inserting the heat transfer tube (20) held by the insertion head (73) into the fin slit (33) from above the fin (30); and the heat transfer tube support (80) configured to support, from below, the heat transfer tube (20) held by the insertion head (73).

According to this embodiment, the heat transfer tube support (80) supports the heat transfer tube (20) from below, and thus dropping of the heat transfer tube (20) from the insertion head (73) can be reduced. In addition, the heat transfer tube support (80) is simply in contact with the lower side of the heat transfer tube (20), and thus the heat transfer tube (20) can be easily held on the insertion head (73). In addition, application of excessive force to the heat transfer tube (20) is reduced, and thus deformation and breakage of the heat transfer tube (20) can be reduced.

(5-2) Second Feature

In the manufacturing device (40) of this embodiment for manufacturing the heat exchanger (10), the heat transfer tube support (80) supports, from below, the outer portions of the heat transfer tubes (20), where when the heat transfer tubes (20) being arranged on the fins (30) are viewed from above, the outer portions of the heat transfer tubes (20) are located outside of two of the fins (30) each located at the respective one of both ends of the heat transfer tubes (20) in the direction in which the plurality of fins (30) are arranged.

According to this embodiment, when the insertion head (73) holding the heat transfer tube (20) moves down to insert the heat transfer tube (20) into the fin slit (33), the second lower arm (82*b*) supports both ends of the heat transfer tube (20) from below when the insertion head (73) is viewed from above. Both ends of the heat transfer tube (20) are the outer portions outside of two of the fins (30) each located at the respective one of both ends in the direction in which the fins (30) are arranged. Accordingly, even when the insertion head (73) moves down, the second lower arm (82*b*) does not come into contact with the fins (30). In this manner, with the second lower arm (82*b*) being not interfered in by the fins (30), the heat transfer tubes (20) can be inserted into the fin slits (33).

(5-3) Third Feature

In the manufacturing device (40) of this embodiment for manufacturing the heat exchanger (10), the second lower arm (82*b*) performs the first operation to come into contact with the heat transfer tubes (20) and the second operation to leave the heat transfer tubes (20).

According to this embodiment, the first operation allows the second lower arm (82*b*) to hold the heat transfer tubes (20) on the insertion head (73), and the second operation allows the second lower arm (82*b*) to leave the heat transfer tubes (20) inserted into the fin slits (33). By the first operation and the second operation being repeated alternately, the fins (30) and the heat transfer tubes (20) can be assembled continuously.

(6) Variations

The above embodiment may be modified like the following variations. Differences from the above embodiment will be described below.

A manufacturing device (40) of this example is different from the manufacturing device (40) of the above embodiment in the heat transfer tube support (80). The details will be described below.

Figure 16:
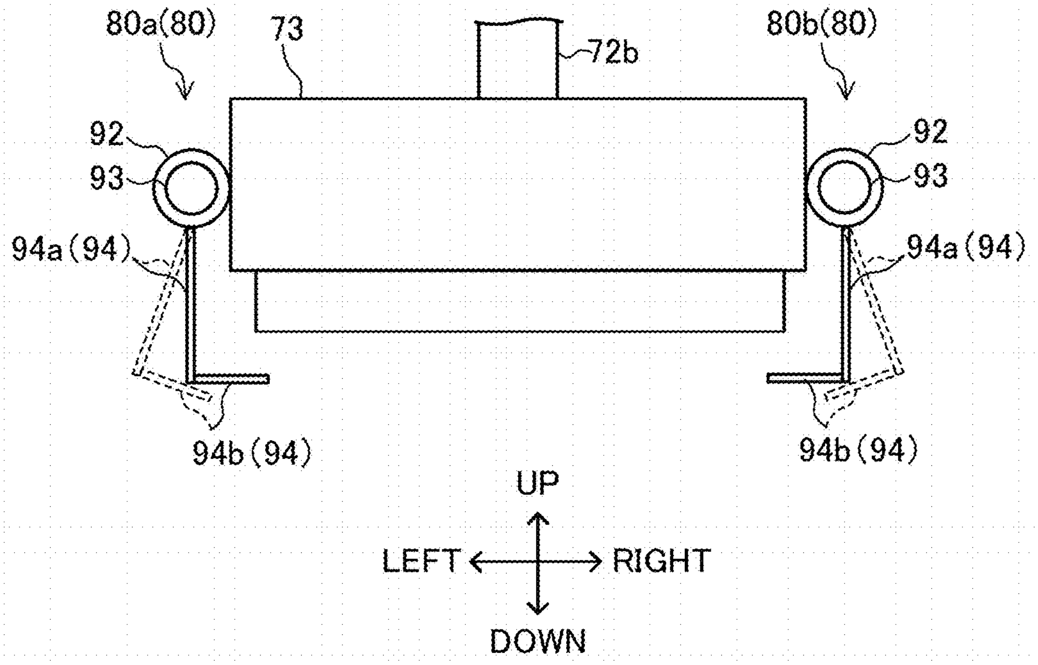
FIG. 16 is a front view showing a schematic configuration of a heat transfer tube insertion unit of a variation.
Figure 17:
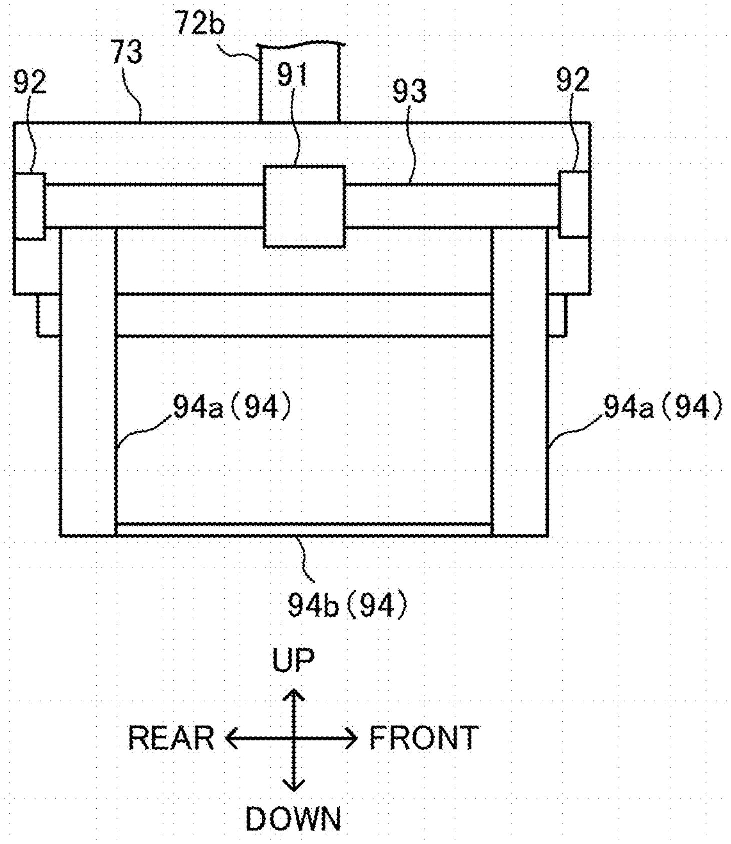
FIG. 17 is a side view showing a schematic configuration of the heat transfer tube insertion unit.
Figure 18:
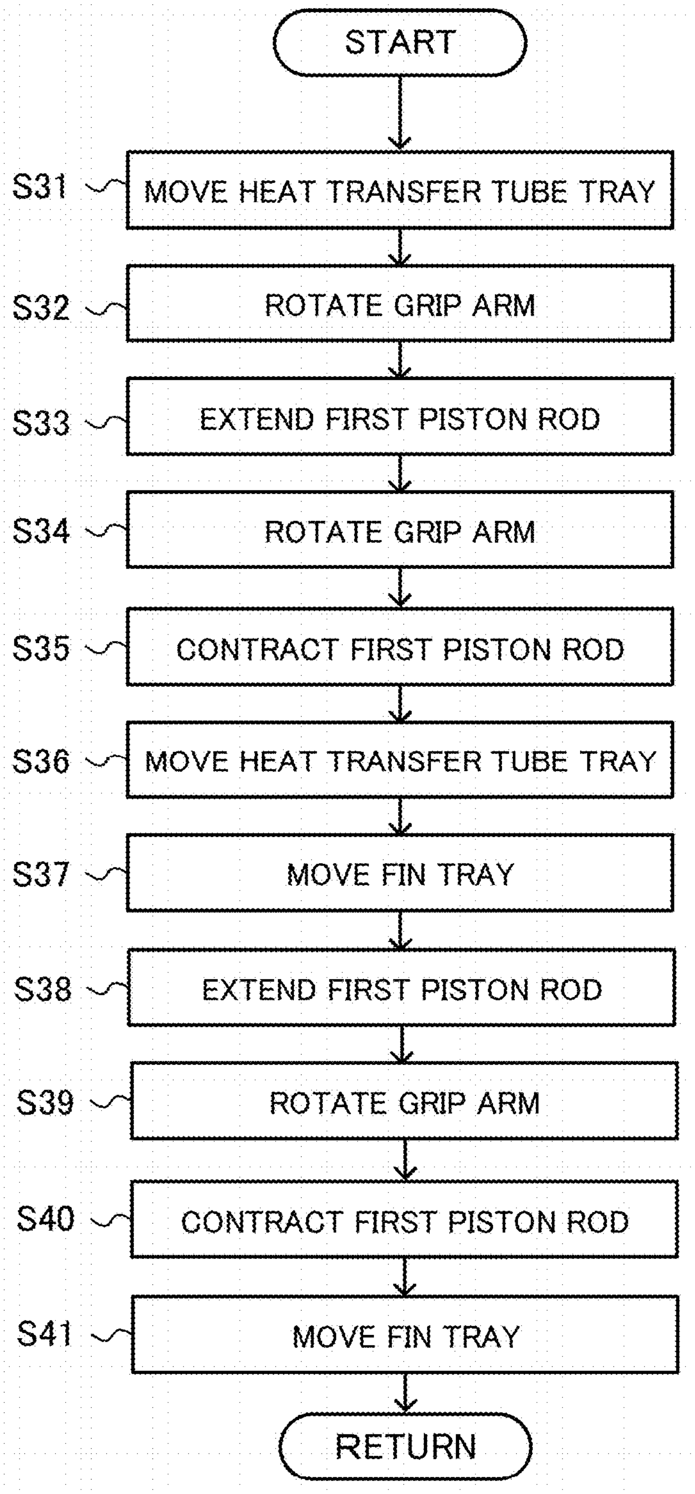
FIG. 18 is a flowchart showing a flow of assembling fins and heat transfer tubes using a manufacturing device.

As shown in FIGS. 16 and 17, each of a first mechanism (80*a*) and a second mechanism (80*b*) of a heat transfer tube support (80) of this example includes a motor (91), a bearing (92), a shaft (93), and a grip arm (94). The first mechanism (80*a*) and the second mechanism (80*b*) operate symmetrically. The components of the first mechanism (80*a*) and the second mechanism (80*b*) are the same and are arranged symmetrically. The description of the first mechanism (80*a*) will be provided below, and the description of the second mechanism (80*b*) will be omitted.

The motor (91) is disposed at the center of and an upper part of a left side surface of an insertion head (73). The motor (91) is connected with the shaft (93) extending from the front end to the rear end of the insertion head (73). The shaft (93) is supported by the bearings (92) fixed to the front end and the rear end of the left side surface of the insertion head (73). The shaft (93) is driven by the motor (91), thereby rotating about the shaft axis. The motor (91) is controlled by a control unit (100).

The grip arm (94) grips heat transfer tubes (20). The grip arm (94) is formed in an L shape. Specifically, the grip arm (94) includes a pair of first arms (94*a*) extending downward from the shaft (93), and a second arm (94*b*) extending horizontally from lower ends of the first arms (94*a*) toward the insertion head (73). One of the pair of first arms (94*a*) is provided at the front end of the shaft (93), and the other one of the pair of first arms (94*a*) is provided at the rear end of the shaft (93). When the insertion head (73) is viewed from the front, the direction in which the grip arm (94) rotates away from the insertion head (73) is referred to as an "opening direction," and the direction in which the grip arm (94) rotates closer to the insertion head (73) is referred to as a "closing direction." As the shaft (93) rotates, the grip arm (94) changes between a first state (the broken lines in FIG. 16) in which the grip arm (94) is opened by a predetermined angle with respect to the vertical direction and a second state (the solid lines in FIG. 16). The first operation of the heat transfer tube support (80) of this example is an operation from the first state to the second state, and the second operation is an operation from the second state to the first state.

Next, operation of the manufacturing device (40) of this example will be described with reference to FIG. 18, FIG. 19A, FIG. 19B and FIG. 19C. In the following description, the "left end" and the "right end" of the heat transfer tube (20) are identical with the "outer portions" of the above embodiment. The left end and the right ends of the heat transfer tubes (20) may be collectively referred to as "both ends." The arrows in FIG. 19A, FIG. 19B and FIG. 19C indicate the directions in which the parts move.

Step S31 is the same as step S11 of the above embodiment, and thus the description thereof will be omitted.

Figure 19A:
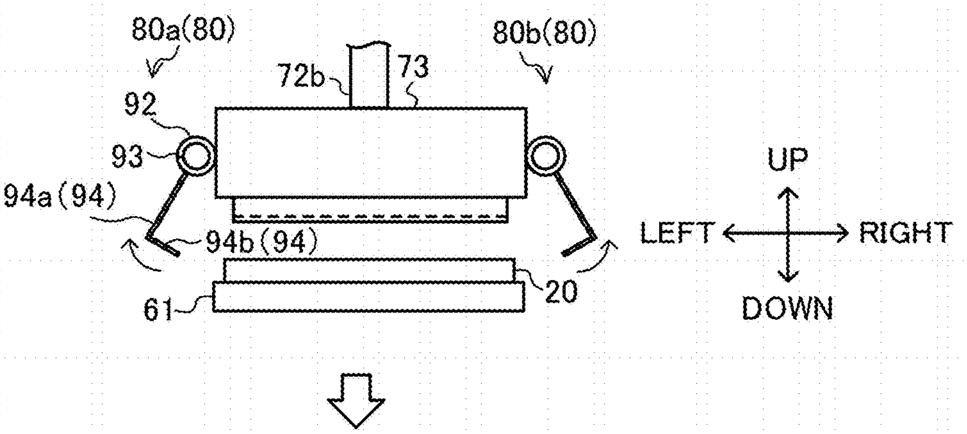
FIG. 19A, FIG. 19B and FIG. 19C show an operation of a heat transfer tube support.

In step S32, the control unit (100) controls the motor (91) so that the grip arms (94) of the first mechanism (80*a*) and the second mechanism (80*b*) rotate in the opening direction. Accordingly, the grip arms (94) switch to the second state (FIG. 19A).

In step S33, the control unit (100) controls the first cylinder (72) to extend the first piston rod (72*b*). Accordingly, the insertion head (73) moves down, and the upper portions of the heat transfer tubes (20) are inserted into the grooves (76). At this time, there is a sufficient clearance between the right end of the second arm (94*b*) of the first mechanism (80*a*) and the left ends of the heat transfer tubes (20), and thus the second lower arm (82*b*) does not come into contact with the heat transfer tubes (20). Similarly, there is a sufficient clearance between the left of the second arm (94*b*) of the first mechanism (80*b*) and the right ends of the heat transfer tubes (20), and thus the second arm (94*b*) does not come into contact with the heat transfer tubes (20).

Figure 19B:
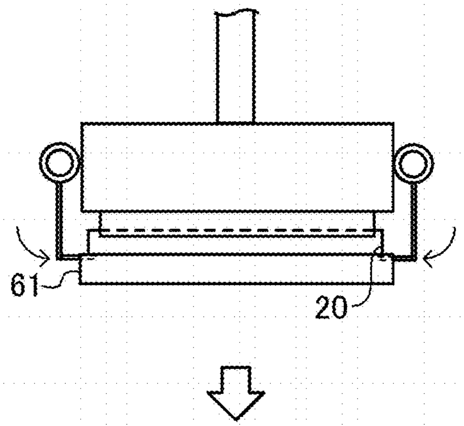

In step S34, the control unit (100) controls the motor (91) so that the grip arms (94) of the first mechanism (80*a*) and the second mechanism (80*b*) rotate in the closing direction. Accordingly, the grip arms (94) switch from the first state to the second state. Specifically, the second arm (94*b*) of the first mechanism rotates from below the heat transfer tubes (20) toward the left ends of the heat transfer tubes (20) so as to draw an arc, thereby abutting onto the lower surfaces of the left ends of the heat transfer tubes (20). Similarly, the second arm (94*b*) of the second mechanism rotates from below the heat transfer tubes (20) toward the right ends of the heat transfer tubes (20) so as to draw an arc, thereby abutting onto the lower surfaces of the right ends of the heat transfer tubes (20) (FIG. 19B).

Steps S35 to S38 are the same as steps S16 to S19 of the above embodiment, and thus the description thereof will be omitted.

Figure 19C:
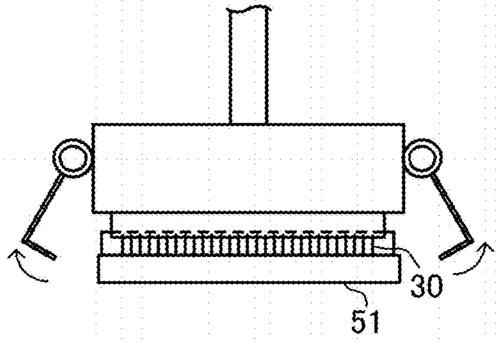

In step S39, the control unit (100) controls the motor (91) so that the grip arm (94) rotates in the opening direction. Accordingly, the grip arms (94) switch from the second state to the first state. Specifically, the second arm (94*b*) of the first mechanism (80*a*) moves obliquely downward of the heat transfer tubes (20) while drawing an arc so as to leave the lower surfaces of the left ends of the heat transfer tubes (20). Similarly, the second arm (94*b*) of the second mechanism (80*b*) moves obliquely downward of the heat transfer tubes (20) while drawing an arc so as to leave the lower surfaces of the right ends of the heat transfer tubes (20). At this time, the right end of the second arm (94*b*) of the first mechanism (80*a*) is located on the left of the left ends of the heat transfer tubes (20), and the left end of the second arm (94*b*) of the second mechanism (80*b*) is located on the right of the right ends of the heat transfer tubes (20) (FIG. 19C).

Steps S40 to S41 are the same as steps S22 to S23 of the above embodiment, and thus the description thereof will be omitted.

The heat transfer tube support (80) of this example also can reduce dropping of the heat transfer tubes (20) from the insertion head (73), and also can reduce deformation and damage of the heat transfer tubes (20) inserted into the insertion head (73).

(7) Other Embodiment

Figure 20:
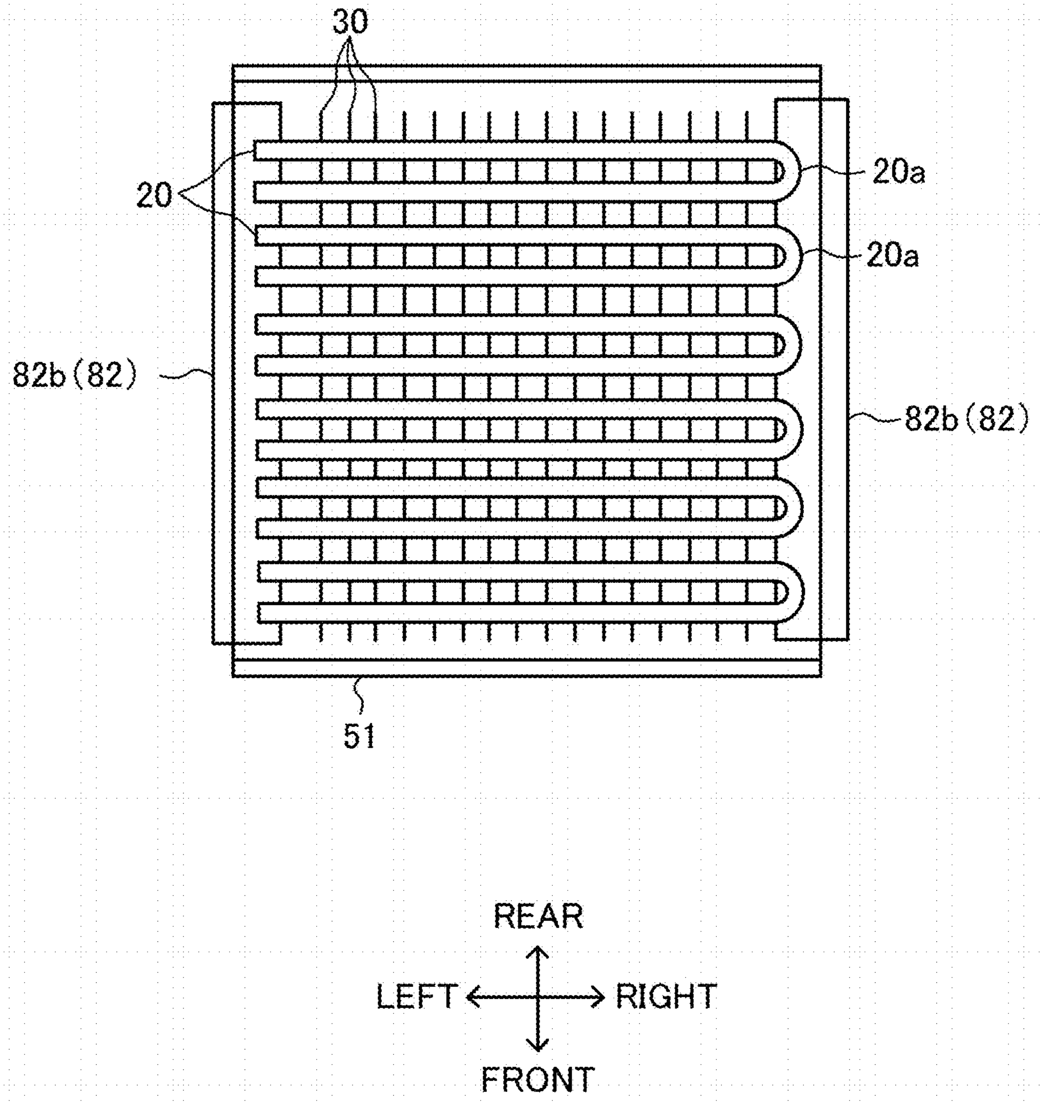
FIG. 20 corresponds to FIG. 15 and shows that heat transfer tubes of another embodiment are supported by a heat transfer tube support.

As shown in FIG. 20, the manufacturing devices (40) of the above embodiment and variation are also applicable to a U-shaped heat transfer tube (20). The U-shaped heat transfer tube (20) is formed by one heat transfer tube (20) being folded at folding portions (20*a*) as a starting point located at the center. The U-shaped heat transfer tube (20) has a left end and a right end which are located at one end of the heat transfer tube tray (61) and has the folding portions (20*a*) which are located at the other end of the heat transfer tube tray (61). The "outer portions" of the above embodiment and variation correspond to both ends and the folding portions (20*a*) of the U-shaped heat transfer tube (20). Specifically, in the heat transfer tube support (80) of the above embodiment, in step S15, the second lower arm (82*b*) of the first mechanism (80*a*) is in contact with the lower surfaces of the folding portions (20*a*) of the U-shaped heat transfer tube (20), and the second lower arm (82*b*) of the second mechanism (80*b*) is in contact with the lower surfaces of both ends of the U-shaped heat transfer tube (20). In step S18, when the insertion head (73) moves down with the U-shaped heat transfer tube (20) being supported by the heat transfer tube support (80), the folding portions (20*a*) and both ends of the U-shaped heat transfer tube (20) correspond to the "outer portions" when the insertion head (73) is viewed from above. Thus, the U-shaped heat transfer tube (20) can be inserted into the fin slit (33) without being interfered by the fin (30).

While the embodiments and variations thereof have been described above, it will be understood that various changes in form and details may be made without departing from the spirit and scope of the claims. The embodiments and the variations thereof may be combined and replaced with each other without deteriorating intended functions of the present disclosure. The expressions of "first," "second," . . . described above are used to distinguish the terms to which these expressions are given, and do not limit the number and order of the terms.

As described above, the present disclosure is useful for a manufacturing device and manufacturing method for manufacturing of a heat exchanger.

The invention claimed is:

1. A manufacturing device for manufacturing a heat exchanger including a flat tube and a fin that is formed in an elongated plate shape and that includes a fin slit formed by notching the fin in a direction orthogonal to a longitudinal direction of the fin, the manufacturing device comprising:

an insertion head configured to move up and down in order to insert the flat tube held by the insertion head into the fin slit from above the fin, the insertion head including a lower surface having a plurality of grooves configured to receive upper portions of the flat tube; and a support configured to support, from below, the flat tube held by the insertion head, the support including opposing support arms configured to support outer portions of the flat tube when the flat tube is received by the grooves of the insertion head, the fin including a plurality of fins arranged in the direction orthogonal to the longitudinal direction, and the support supporting, from below, the outer portions of the flat tube when the flat tube is arranged on the plurality of fins, such that when viewed from above, the outer portions of the flat tube are located outside of two of the fins each located at a respective one of both ends of the flat tube in the direction in which the plurality of fins are arranged.

2. The manufacturing device of claim 1, wherein the support performs a first operation to come into contact with the flat tube and a second operation to separate from the flat tube.

3. A manufacturing device for manufacturing a heat exchanger including a flat tube and a fin that is formed in an elongated plate shape and that includes a fin slit formed by notching the fin in a direction orthogonal to a longitudinal direction of the fin, the manufacturing device comprising:

an electronic controller configured to control an insertion head to move up and down in order to insert the flat tube held by the insertion head into the fin slit from above the fin; and a support to support, from below, the flat tube held by the insertion head, the fin including a plurality of fins arranged in the direction orthogonal to the longitudinal direction, and the electronic controller being further configured to control the support to support, from below, outer portions of the flat tube when the flat tube is arranged on the plurality of fins, such that when viewed from above, the outer portions of the flat tube are located outside of two of the fins each located at a respective one of both ends of the flat tube in the direction in which the plurality of fins are arranged.

4. A manufacturing method using the manufacturing device of claim 1 for manufacturing a heat exchanger including a flat tube and a fin that is formed in an elongated plate shape and that includes a fin slit formed by notching the fin in a direction orthogonal to a longitudinal direction of the fin, the manufacturing method comprising:

using the insertion head to hold the flat tube;

supporting, from below, the flat tube held by the insertion head; and inserting the flat tube into the fin slit from above the fin by the insertion head moving up and down.

* * * * *